July 22, 1969    J. J. QUINN    3,456,537
APPARATUS FOR DISPENSING STENCIL LABELS OF
SELECTED, ACCURATELY DETERMINED LENGTH
Filed May 31, 1967    7 Sheets-Sheet 1
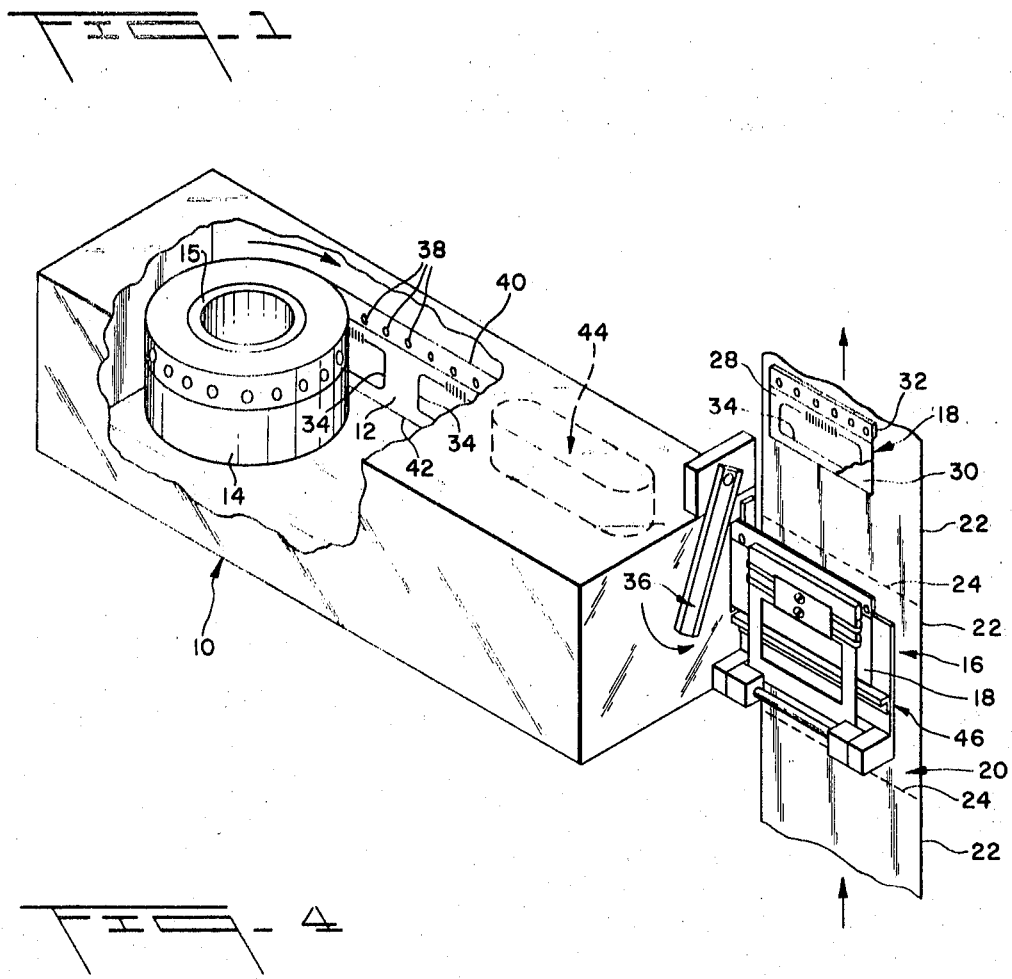
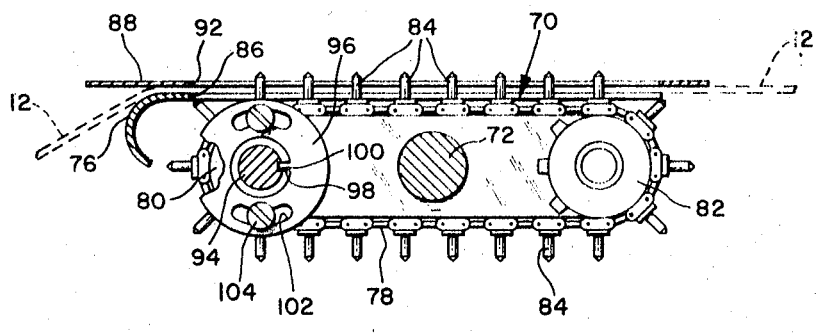
INVENTOR.
JOHN J. QUINN
BY
Samuelow & Jacob
HIS ATTORNEYS

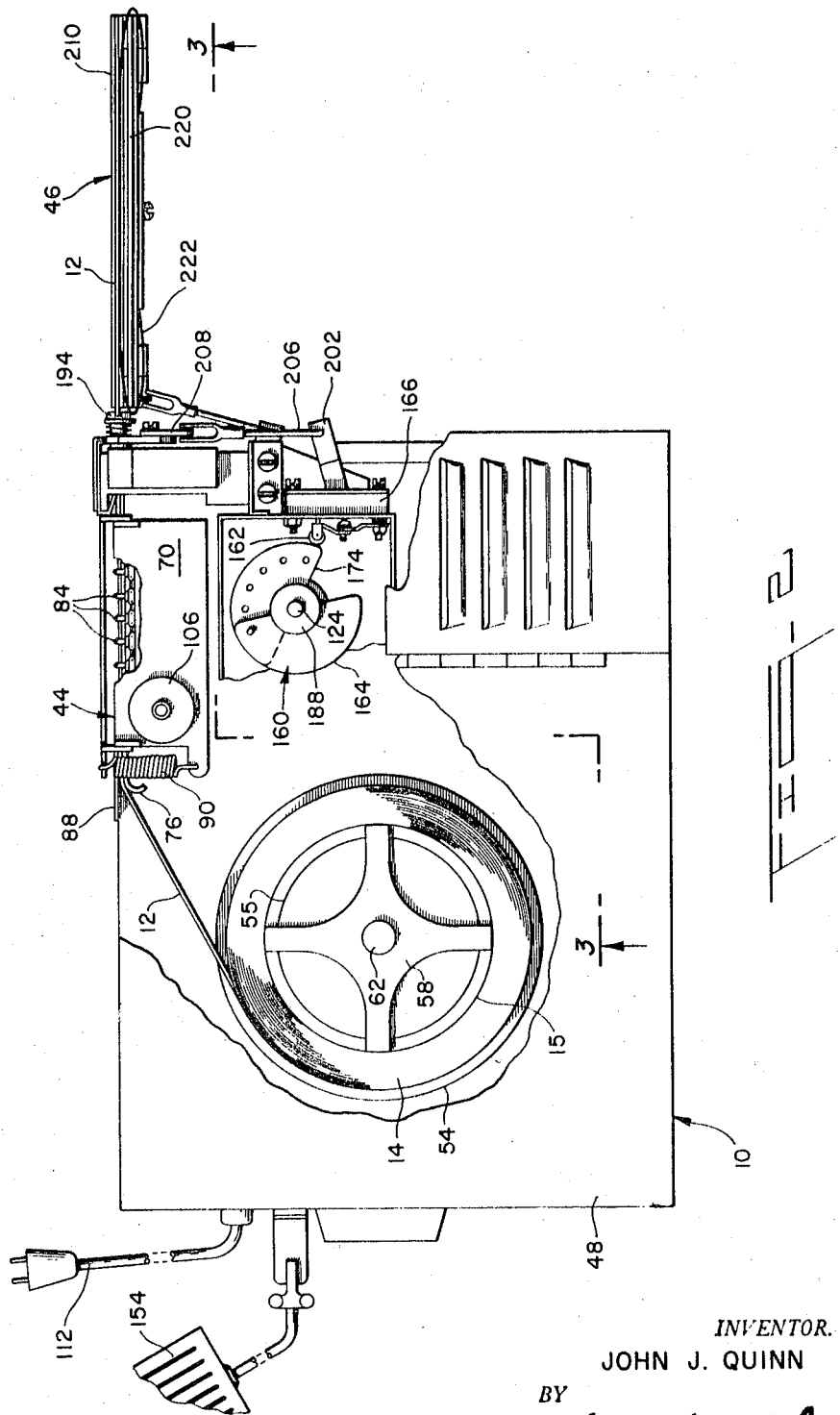

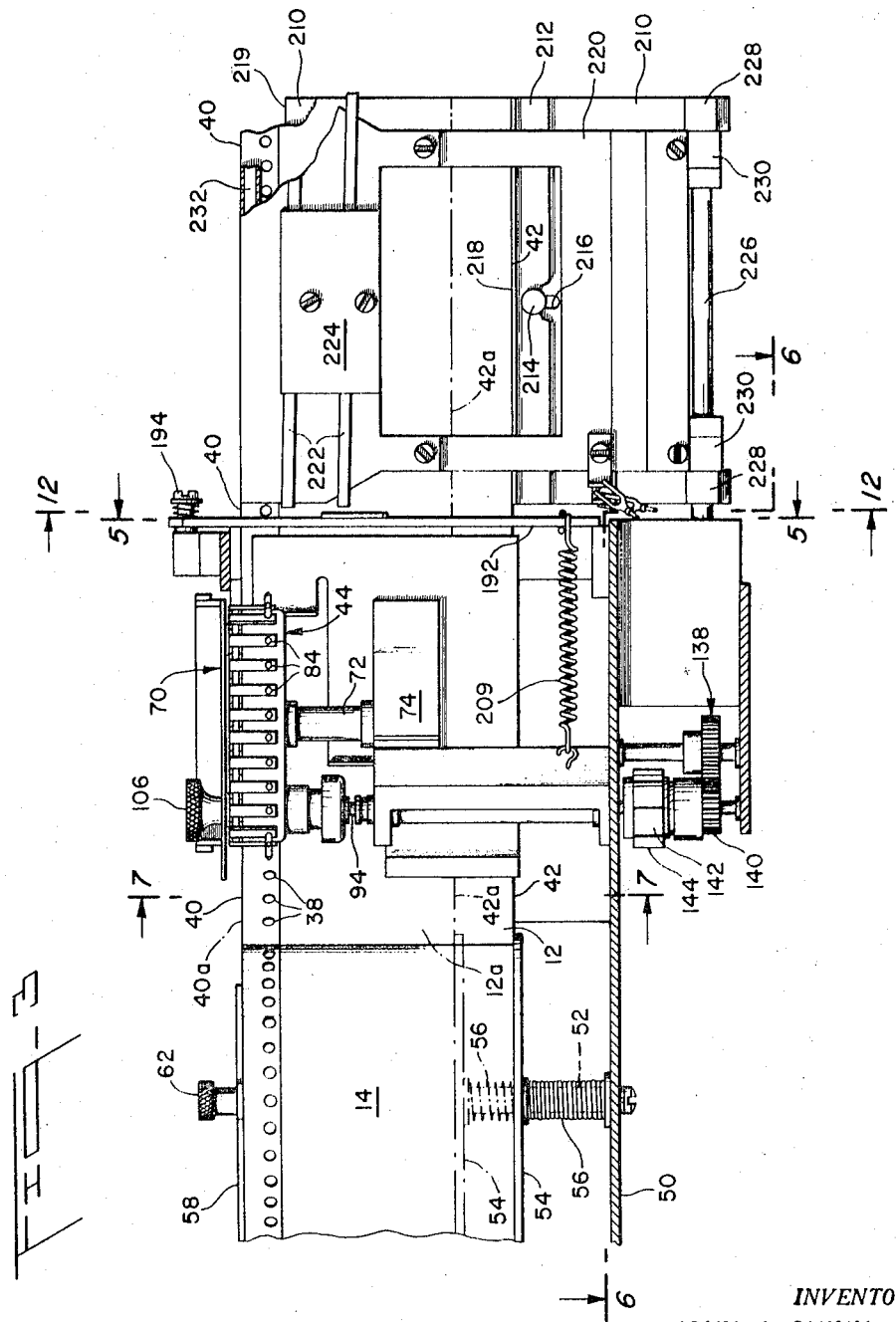

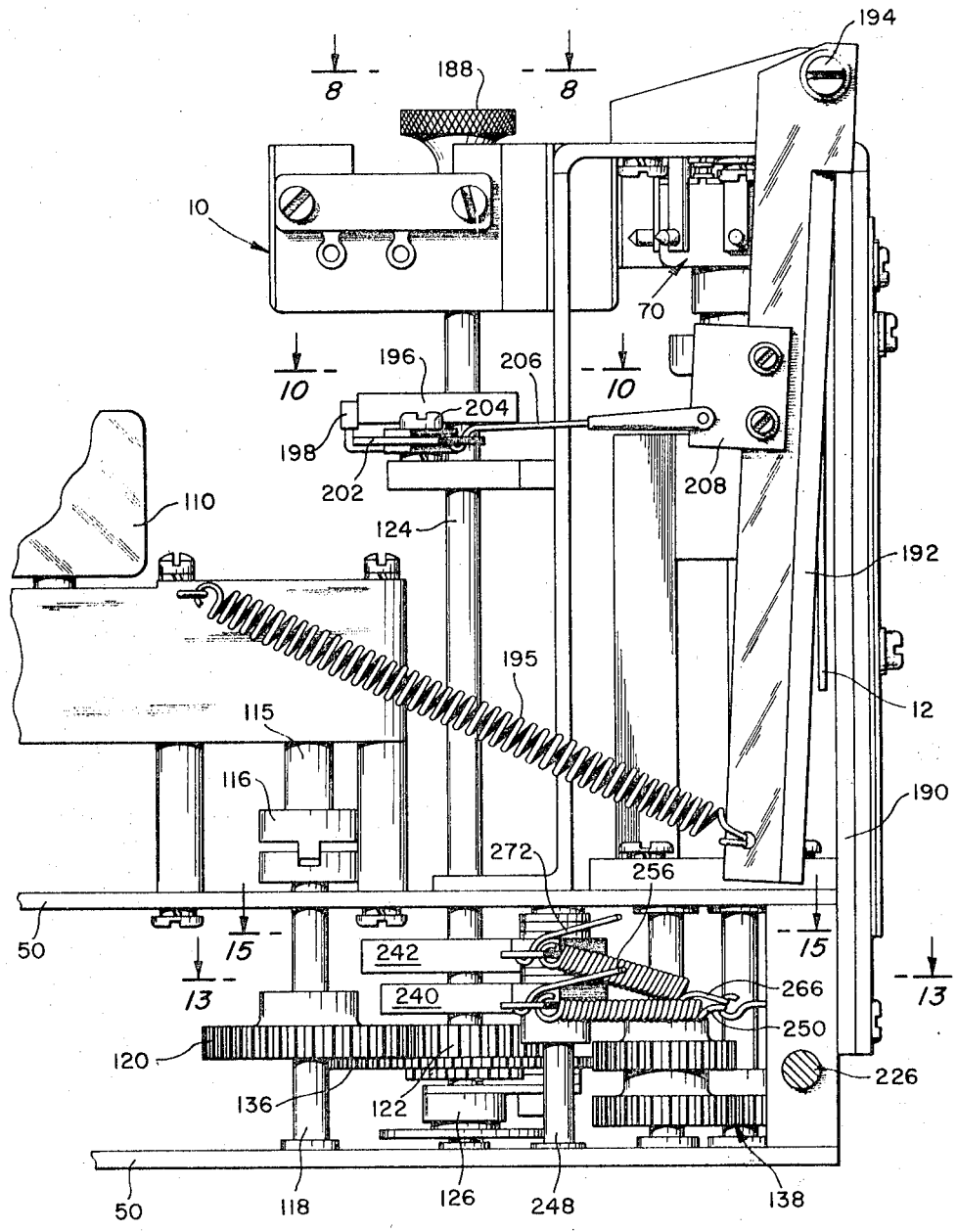

July 22, 1969  J. J. QUINN  3,456,537
APPARATUS FOR DISPENSING STENCIL LABELS OF
SELECTED, ACCURATELY DETERMINED LENGTH
Filed May 31, 1967  7 Sheets-Sheet 5
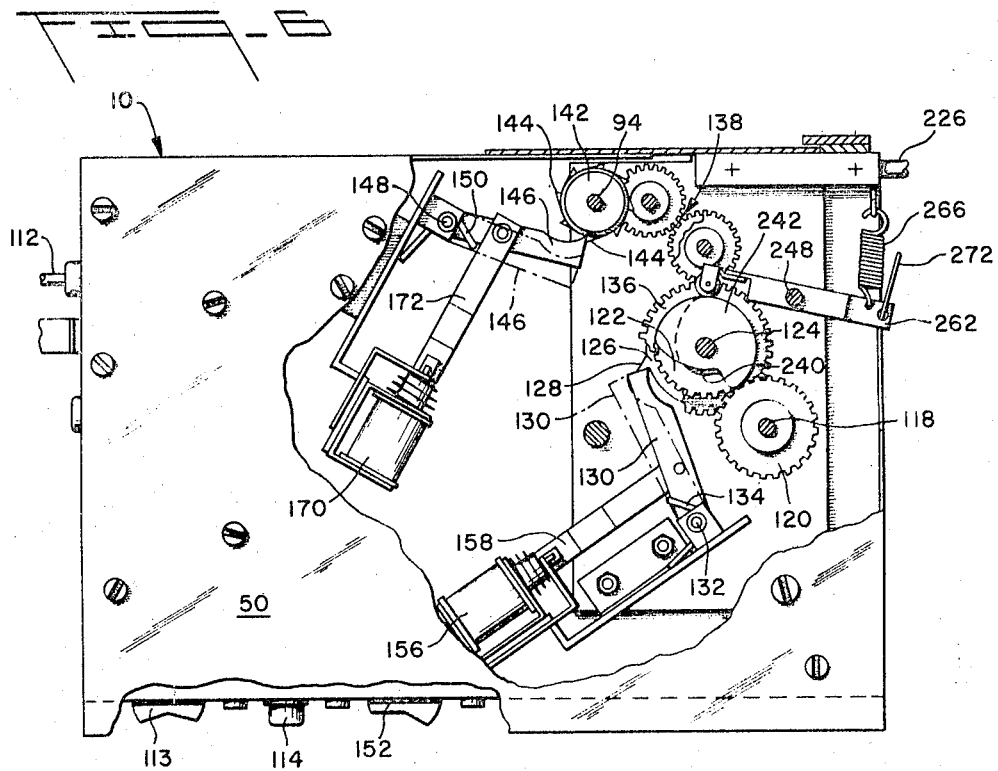
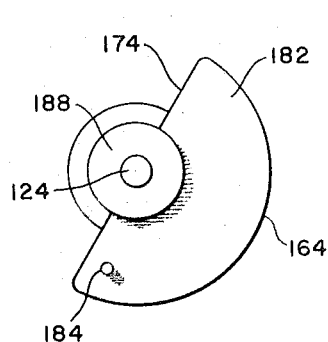
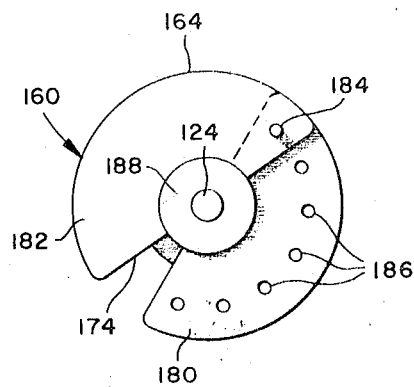
INVENTOR.
JOHN J. QUINN
BY
HIS ATTORNEYS July 22, 1969
J. J. QUINN
3,456,537
APPARATUS FOR DISPENSING STENCIL LABELS OF
SELECTED, ACCURATELY DETERMINED LENGTH
Filed May 31, 1967
7 Sheets-Sheet 6
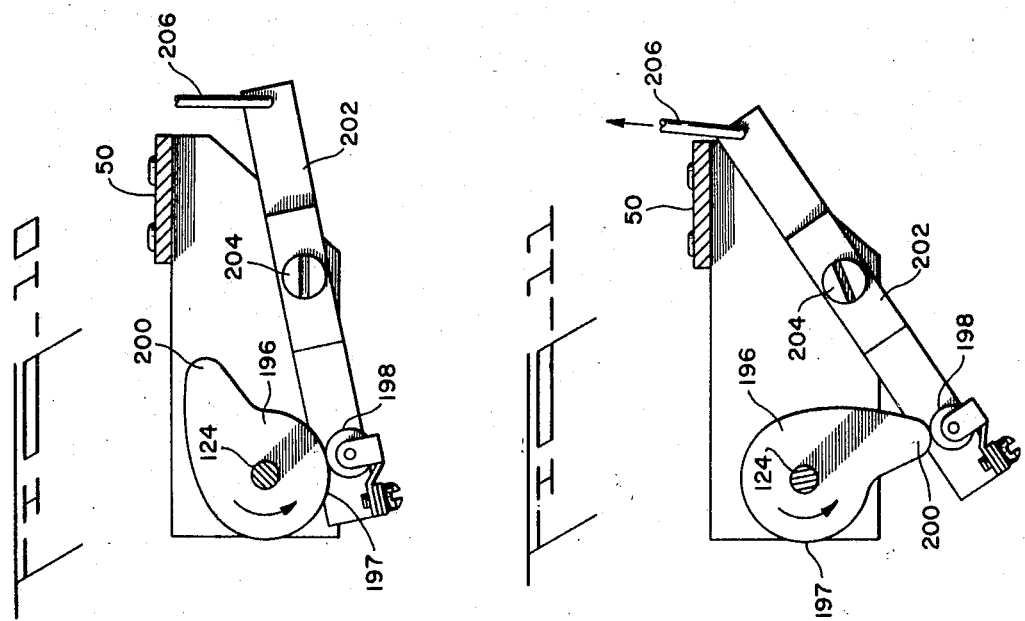
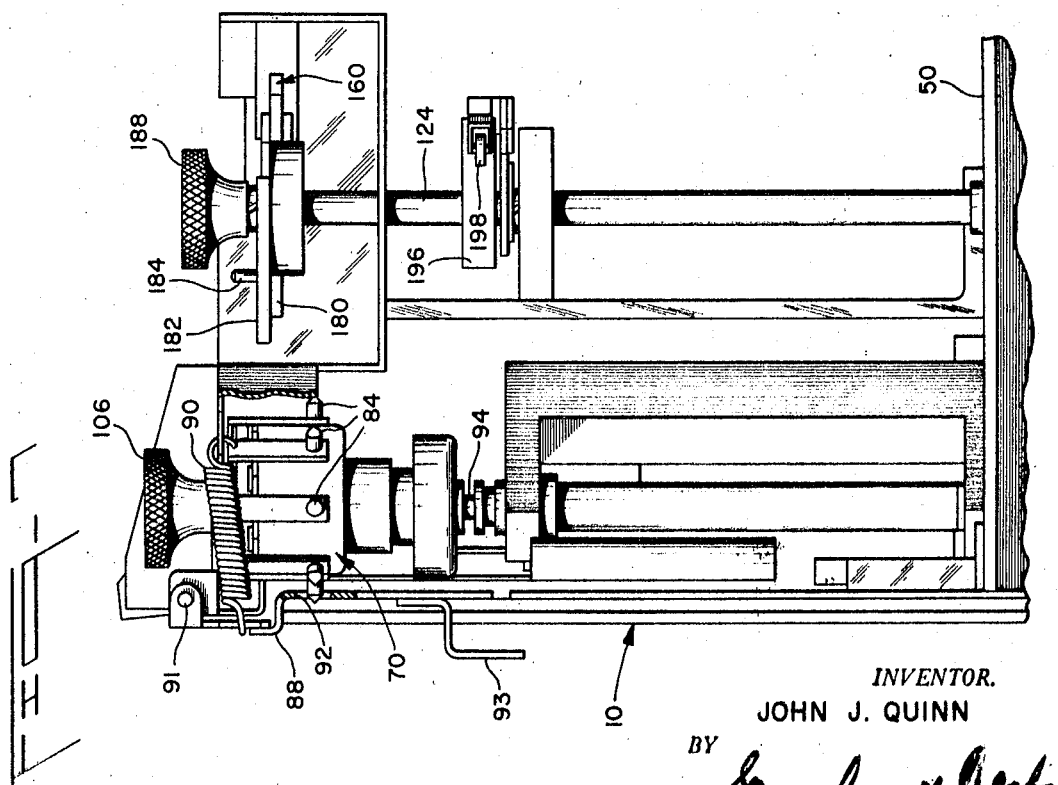
INVENTOR.
JOHN J. QUINN
BY
HIS ATTORNEYS

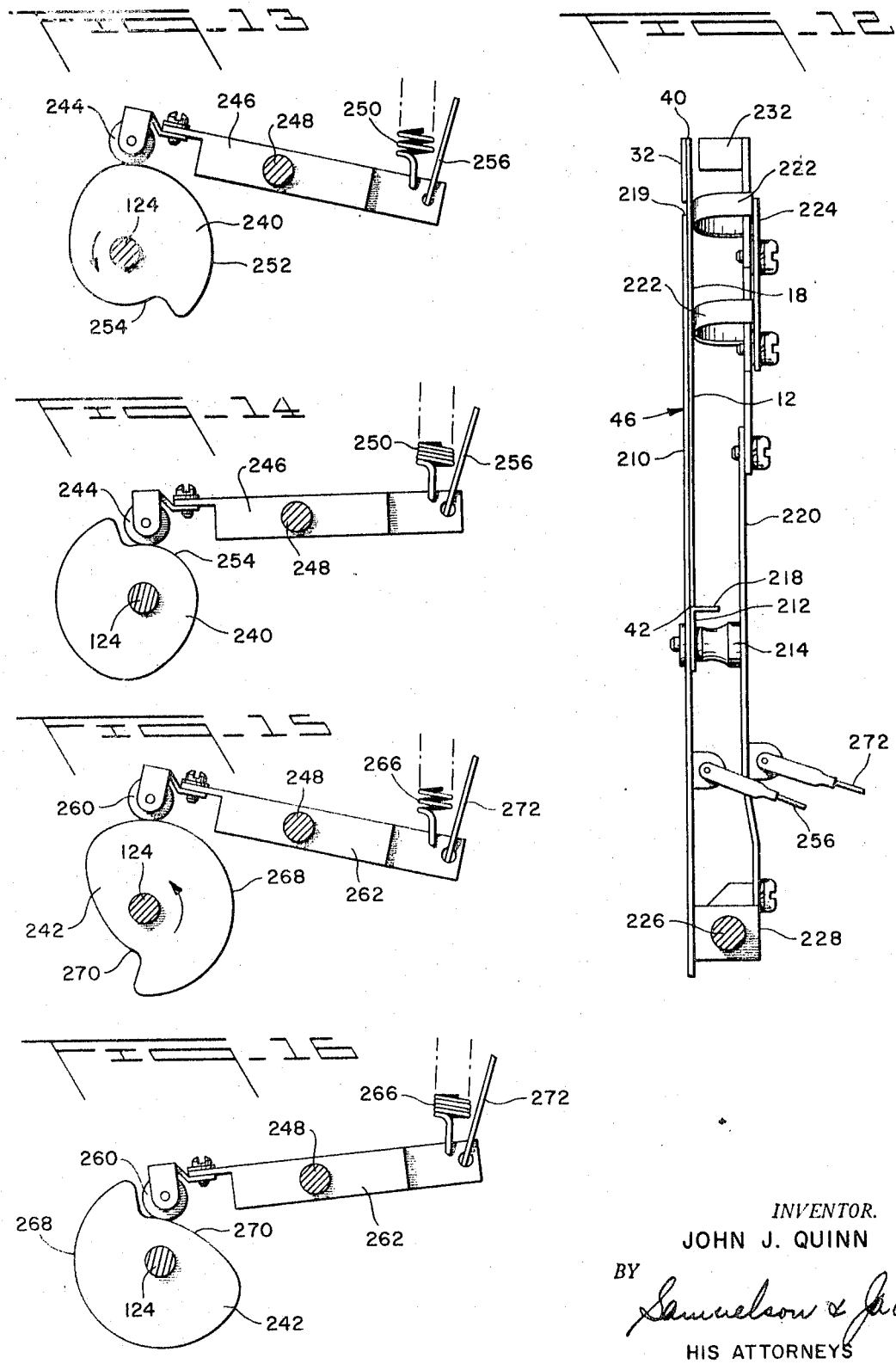

United States Patent Office 3,456,537
Patented July 22, 1969

---

3,456,537
APPARATUS FOR DISPENSING STENCIL LABELS OF SELECTED, ACCURATELY DETERMINED LENGTH
John J. Quinn, Raynham, Mass., assignor to Dymo Industries, Inc., Emeryville, Calif., a corporation of California
Filed May 31, 1967, Ser. No. 642,578
Int. Cl. B26d 7/00, 5/20, 5/16
U.S. Cl. 83—162          18 Claims

ABSTRACT OF THE DISCLOSURE

Apparatus for dispensing stencil labels of accurately determined length from a coil of strip material of indeterminate length wherein the mechanism for feeding the strip material is coupled to a continuously operating drive through a timing mechanism and a selector including a cam surface of variable angular extent and a follower arranged to operate a solenoid actuated latch and multi-toothed clutch mechanism such that the feed mechanism is actuated in fixed increments determined by the spacing of the teeth of the clutch mechanism, and the angular extent of the cam surface will determine the number of such fixed increments through which the clutch mechanism will engage the drive to actuate the feed mechanism. Preferably, the strip material is provided with a series of uniformly spaced apertures and the feed mechanism includes a series of uniformly spaced pins which travel in a straight line to engage the apertures and advance the strip material in predetermined, accurate increments. The strip material is conveniently oriented in the apparatus for consistent alignment of at least one edge of the strip material with a fixed path so that strips of various widths can be accommodated without requiring adjustments in the operating components of the apparatus.

---

The present invention relates generally to apparatus for dispensing stencil labels of accurately determined length from strip material of indeterminate length and pertains, more specifically, to apparatus wherein the length of the dispensed stencil labels may be selectively varied with ease without upsetting the accuracy of the selected length of each dispensed stencil label.

Stencil assemblies in the form of relatively small labels are assuming increased importance in business operations where it is desirable to prepare several documents, each having identical information thereon. For example, the same name and address may be placed upon a shipping label or directly upon a shipping carton and upon an invoice or packing slip by preparing a master stencil simultaneous with the preparation of the invoice or packing slip and then employing the stencil for marking the shipping label or carton. In many instances these invoices, packing slips or other documents are prepared from sheet material of indeterminate length which is printed with the desired business forms so that a continuous length of sheet material containing a series of forms of predetermined length may be fed through a typewriter or other character-forming business machine which will imprint the necessary data on successive forms. The sheet material is usually perforated between contiguous forms to allow subsequent separation of the sheet into individual documents.

The stencil assemblies are usually provided with some means for securing the relatively small stencil label to the surface of the sheet material, the means ordinarily being in the form of a pressure sensitive adhesive.

In order to increase ease of handling as well as reduce overall expense, the individual stencil labels are advantageously fabricated by being severed from an indeterminate length of strip material having all of the components of the individual stencil assemblies, but in continuous length, preferably at the point of use of the stencil labels. It would be desirable, then, to have available an apparatus which could form and dispense the stencil labels from the strip material at the point of use.

Where the individual stencil labels carry previosuly imprinted matter, such as a die-impressed border or some other functional or decorative matter, which must be accurately positioned with respect to each label, it becomes essential that the strip material be severed at an exact, predetermined location along the strip and it becomes necessary that the dispensing apparatus be capable of severing the strip at such an exact location to present individual stencil labels of accurate predetermined length and with any such imprinted matter thereon in proper registration with the length of the label. Thus, the apparatus should be capable of advancing the strip material in accurate increments of length with no cumulative gain or loss over long lengths of strip material.

It is therefore an important object of the invention to provide an apparatus which is capable of advancing a strip of stencil label material of indeterminate length in fixed increments of consistently accurate predetermined length.

Another object of the invention is to provide an apparatus as above which can not only advance the strip material in accurate increments, but will sever each advanced increments at a consistently accurate location to form stencil labels of prescribed length.

A further object of the invention is to provide apparatus of the nature described above which can accommodate several different widths of strip material without requiring adjustments and which can be adjusted easily to select any one of a variety of stencil label lengths without sacrificing the accuracy with with each length is produced.

A still further object of the invention is to provide an apparatus as above which can attach a stencil label to the surface of a sheet as a part of the operating cycle of the apparatus.

Still another object of the invention is to provide an apparatus as described above which is simple in design and construction so as to be economically fabricated, easily operated and dependable in use.

The above objects, as well as further objects and advantages, are attained in the apparatus of the invention which may be described briefly as an apparatus for dispensing stencil labels of selected length from a supply of strip material of indeterminate longitudinal length and finite lateral width between opposite edges thereof, and for locating each dispensed label at a predetermined location, the apparatus comprising a frame, feed means associated with the frame for advancing an increment of the strip material along a prescribed path from the supply to the predetermined location, drive means associated with the frame and operating continuously during operation of the apparatus, operator means, timing means selectively coupled with the drive means for actuation through at least one complete cycle of operation in response to actuation of the operator means, selector means for coupling the feed means with the drive means to engender actuation of the feed means by the drive means in response to actuation of the timing means, but only during that portion of the full cycle of operation of the timing means necessary to advance an increment of the strip material corresponding to the selected length of the stencil label, cut-off means associated with the frame between the feed means and the predetermined location for severing the advanced increment from the strip material to establish the stencil label, and means for coupling the cut-off means with the drive means to engender actuation of the cut-off means by the drive means in response to actuation of the timing means, after completion of the portion of the full cycle of operation of the timing means during which the feed means is actuated.

The invention will be understood more readily, and further objects and advantages thereof will become apparent in the following detailed description of a preferred embodiment illustrated in the accompanying drawing, in which:

FIGURE 1 is a diagrammatic perspective view illustrating the general function and arrangement of an apparatus constructed in accordance with the invention;

FIGURE 2 is a plan view of the apparatus with portions cut away to expose some details of construction;

FIGURE 3 is a cross-sectional view taken along line 3—3 of FIGURE 2;

FIGURE 4 is an enlarged plan view illustrating details of the feed means of the apparatus;

FIGURE 5 is an enlarged cross-sectional view taken along line 5—5 of FIGURE 3;

FIGURE 6 is a cross-sectional view taken along line 6—6 of FIGURE 3;

FIGURE 7 is an enlarged cross-sectional view taken along line 7—7 of FIGURE 3;

FIGURE 8 is an enlarged plan view of a portion of the selector means as seen from line 8—8 of FIGURE 5;

FIGURE 9 is a view similar to FIGURE 8, but with the selector means set differently;

FIGURE 10 is an enlarged cross-sectional view taken along line 10—10 of FIGURE 5;

FIGURE 11 is similar to FIGURE 10, but with the component parts in another position of operation;

FIGURE 12 is an enlarged cross-sectional view taken along line 12—12 of FIGURE 3;

FIGURE 13 is an enlarged cross-sectional view taken along line 13—13 of FIGURE 5;

FIGURE 14 is a view similar to FIGURE 13 with the component parts in another position of operation;

FIGURE 15 is an enlarged cross-sectional view taken along line 15—15 of FIGURE 5; and FIGURE 16 is a view similar to FIGURE 15 with the component parts in another position of operation.

Referring now to the drawing, FIGURE 1 illustrates diagrammatically the function of apparatus 10, which is constructed in accordance with the invention. A strip 12 of material of indeterminate length is shown within apparatus 10 and is advanced by the apparatus from a supply shown in the form of coil 14 wound upon an arbor 15 about a central axis which extends laterally with respect to the strip 12, toward a predetermined location 16 where a stencil label 18 of selected length is severed from the strip 12 for attachment to an elongate sheet 20. Sheet 20 is divided into discrete lengths 22 by lateral perforated lines 24, each of the discrete lengths usually being a business form such as, for example, an invoice for the purchase of goods. The stencil label 18 is to be affixed at a predetermined location on each discrete length 22, in this instance at the position where the name and address of the purchaser of the goods is to be placed.

Stencil label 18 is an assembly made up of a stencil sheet 28 associated with some form of duplicating means, such as a carbon layer 30, and an adhesive means, such as a length of pressure sensitive adhesive tape 32. The pressure sensitive adhesive tape secures the stencil label to the surface of sheet 20 at the predetermined location on discrete length 22 so that when sheet 20 is later carried into a character-forming business machine (not shown), the impriting operation of that machine will cut a master stencil in stencil sheet 28 and simultaneously print the same information upon the sheet 20 by virtue of the carbon layer 30. Stencil sheet 28 can then be removed from the sheet 20 and employed to mark the carton in which the purchased goods are shipped while the invoice has already been imprinted with the necessary information.

It is noted that the stencil sheet of stencil labels such as label 18 are often provided with previously imprinted matter, such as a border 34, for either decorative or functional purposes. The existence of such imprinted matter on the strip 12 requires that the length of each stencil label 18 be accurately determined and the strip 12 must be accurately advanced in order to present the correct increment of length of strip 12 at location 16 so that the strip will be accurately registered with respect to a cutoff means 36 shown associated with apparatus 10 between the coil 14 and the location 16 and the stencil label 18 will be severed from the strip 12 precisely between adjacent borders 34.

In order to assure advancement of the strip 12 without error, the strip is preferably provided with a series of uniformly spaced apertures 38 adjacent one edge 40 of opposite edges 40 and 42 of the strip 12. The apertures 38 cooperate with feed means 44 within apparatus 10 as will be explained in greater detail hereinafter.

The advanced increment of the strip 12 is received within tray means 46 at location 16 and the stencil label 18 which is severed from the strip 12 is held at location 16 by the tray means, all as will be explained in greater detail later.

Turning now to FIGURES 2 and 3, apparatus 10 is seen to have a housing or cover 48 and a frame 50 upon which is fixed a vertical spindle 52 which carries support means shown in the form of a platform 54 which can slide vertically upwardly or downwardly along the spindle and which carries a central hub 55. The platform 54 is resiliently urged upwardly by a helical support spring 56 so that when a coil 14 of strip material 12 is placed over hub 55 and rested on platform 54 with the central axis of the coil oriented vertically, the platform will be depressed against the force of spring 56. A cover plate 58 is placed over the arbor 15 of the coil 14 and secured in place with a thumb screw 62. Thus, the coil 14 is urged upwardly against the cover plate and the fixed location of the cover plate determines the location of the upper edge 40 of strip 12 thereby defining a fixed horizontally directed longitudinal path along which the upper edge 40 will travel through apparatus 10 and a line of travel which will be followed by the series of spaced apertures 38. The fixed path remains unchanged regardless of the width of strip 12 between edges 40 and 42 since platform 54 is movable vertically to accommodate a range of widths and will always be urged upwardly by the force of spring 56. Thus, an alternate width strip is shown in phantom at 12a and has a lower edge 42a resting on the platform which is now raised to the position shown in phantom so that the upper edge 40a of strip 12a coincides with the same path followed by edge 40 of strip 12.

The upward force of spring 56 also serves to establish a drag upon the coil 14 as a result of the frictional force between cover plate 58 and arbor 15 so that a beneficial tension is established in the strip 12 as it is drawn from coil 14.

Also located on frame 50, downstream from the coil 14, is feed means 44 which is now seen to be in the form of a tractor mechanism 70. As best seen in FIGURE 4, as well as in FIGURES 2 and 3, the tractor mechanism 70 is mounted upon a support rod 72 which extends vertically from a bracket 74 fixed to the frame 50. The tractor mechanism has a slide plate 76 against which the strip 12 rests by virtue of the tension in the strip. An endless chain 78 passes around a drive sprocket 80 and an idler sprocket 82 and carries a series of pins 84 which pass through a slot 86 in the slide plate 76 and which are spaced longitudinally to match the spacing of apertures 38 of strip 12. A pressure plate 88 is pivotally mounted at 91 (see FIGURE 7) and is biased toward the slide plate 76 by means of a spring 90 (also see FIGURE 7) and also has a slot 92 into which the pins 84 may pass. Strip 12 is threaded through the tractor mechanism 70 by lifting pressure plate 88 at handle 93 to expose the pins 84 for the reception of apertures 38 of strip 12 and the strip is made to pass between the slide plate 76 and the pressure plate 88 with the pins 84 passing through the apertures 38, the pressure plate thereby assuring that the strip will not become disengaged from the pins. Strip 12 is thus positively engaged and may be advanced by movement of endless chain 78. Such movement is imparted by rotation of drive sprocket 80 which is operatively engaged with a drive shaft 94 through a drive plate 96 having a key 98 engaging key slot 100 in the drive shaft. The drive plate 96 is angularly adjustable with respect to the drive sprocket by virtue of slots 102 through which screws 104 pass, the screws connecting the drive plate 96 with the drive sprocket 80 so that upon loosening of the screws minor adjustments in the longitudinal location of pins 84 relative to the angular position of drive shaft 94 may be made to assure accurate registration of strip 12 with the cut-off means 36. Drive shaft 94 extends vertically downwardly to be rotated as will be explained below. The tractor mechanism 70 is held in place in apparatus 10 by a thumb nut 106 and is easily lifted out of the apparatus after removal of the thumb nut 106.

Turning now to FIGURES 5 and 6, as well as to FIGURES 2 and 3, apparatus 10 has a drive means which includes a drive motor 110 which receives electrical current from line cord 112, when the apparatus is switched on at 113, to run continuously during use of the apparatus. Pilot light 114 indicates when the apparatus is switched on. The output shaft 115 of motor 110 drives motor coupling 116 which, in turn, rotates a main drive shaft 118 carrying main drive gear 120. Main drive gear 120 is meshed with main driven gear 122 which is coupled to timing means shown in the form of a cam shaft 124 coupled to driven gear 122 by a clutch 126 having a single tooth 128. Ordinarily, the cam shaft 124 is at rest, even though main driven gear 122 is continuously rotating, by virtue of tooth 128 being engaged with a latch 130 pivotally mounted at 132 and resiliently urged into engagement with tooth 128 by the bias force of a spring 134 to force the clutch to disengage the driven gear 122 from the cam shaft 124.

Additionally, a further drive gear 136 is coupled for rotation with the driven gear 122 and, in turn, drives a gear train 138 which rotates a feed mechanism drive gear 140 (see FIGURE 3), the gear train 138 and drive gear 140 being in continuous rotation. The feed mechanism drive gear 140 is coupled with the tractor mechanism drive shaft 94 by a multi-toothed clutch 142 having, in this instance, eight teeth 144 spaced uniformly around the perimeter of the clutch 142. Ordinarily, the drive shaft 94 is at rest, even though the drive gear 140 is continuously rotating, by virtue of one of the teeth 144 of clutch 142 being engaged with a latch 146 pivotally mounted at 148 and resiliently urged into engagement with a tooth 144 by the bias force of a spring 150 to force the clutch 142 to disengage the drive gear 140 from the drive shaft 94.

When it is desired to actuate the tractor mechanism 70 to advance a prescribed length of strip 12, a momentary toggle switch 152 or, alternately, a corresponding pedal switch 154 (FIGURE 2) is depressed to momentarily energize a solenoid 156 which will disengage latch 130 from the tooth 128, as seen in phantom in FIGURE 6, by drawing link 158 toward the solenoid 156 and pivoting the latch 130 in a counterclockwise direction about pivot 132 against the bias of spring 134. In this manner, tooth 128 is rendered free to rotate counterclockwise and clutch 126 will engage driven gear 122 with cam shaft 124 to allow motor 110 to rotate the cam shaft. Upon de-energization of the solenoid, the latch 130 is returned to its initial position in the path of the tooth 128 by the spring 134 and upon completion of a full revolution, the cam shaft 124 will again be disengaged from the driven gear 122 by the clutch 126. The one revolution constitutes one complete cycle of operation of the timing means and one full cycle of operation of the apparatus 10.

During the one full revolution of the cam shaft 124, a selector means will engage the drive means with the feed means 44 to engender actuation of the feed means for that portion of the cycle of operation of the timing means which is necessary to advance an increment of the strip 12 corresponding to the selected length of the stencil label 18. As best illustrated in FIGURES 2 and 7, as well as in FIGURE 6, the selector means includes a cam assembly 160 fixed for rotation with cam shaft 124 at the top of the cam shaft 124. A follower 162 is resiliently biased against the arcuate surface 164 of the cam assembly and is linked to an electrical switch 166. Electrical switch 166 is electrically connected with another solenoid 170 (see FIGURE 6) which is interconnected with the latch 146 by a link 172. As long as the follower 162 is retained in the position shown in FIGURE 2, against the resilient bias of the follower toward the cam assembly, the solenoid 170 remains de-energized and spring 150 will retain latch 146 in engagement with a tooth 144 of clutch 142 so that drive shaft 94 remains stationary. When the cam assembly 160 rotates to the position where the follower 162 can drop into the gap 174 in arcuate surface 164 and thereby move to a second position, the switch 166 will be actuated by such movement of the follower to energize solenoid 170 which, in turn, will draw the link 172 toward the solenoid 170 and release the latch 146 from engagement with a tooth 144 of the clutch 142, as seen in phantom in FIGURE 6, rendering the tooth 144 free to rotate in a clockwise direction, thus permitting the clutch 142 to engage the drive shaft 94 with drive gear 140 to allow the drive shaft to be rotated in a clockwise direction with concomitant actuation of the tractor mechanism 70 to advance the strip 12.

When the cam assembly 160 has rotated sufficiently to once again engage the follower 162 with arcuate surface 164, the switch 166 will again be actuated to de-energize solenoid 170 and permit the return of latch 146 into the path of teeth 144 of clutch 142. As soon as a tooth 144 engages the latch 146, the clutch 142 will disengage the drive shaft 94 from drive gear 140 and the rotation of drive shaft 94 will stop.

Thus, it is seen that the advancement of strip 12 by the tractor mechanism 70 is directly related to the angular displacement of drive shaft 94 permitted by the clutch 142 and is limited to very accurately fixed increments determined by the fixed spacing of teeth 144 from one another. The total number of these fixed increments which will make up the total increment of advancement of the strip 12 is determined by the number of teeth 144 which are permitted to pass latch 146 while the solenoid 170 is energized. Hence, the angular extent of the gap 174 in the cam assembly 160, or, conversely, the angular extent of the arcuate surface 164 will regulate the advancement of strip 12 so that strip 12 can be advanced accurately through a total increment of advancement having any one of seven predetermined, selectable lengths during each operating cycle of the apparatus 10.

In order to enable manual selection of any one of the seven lengths of feed set forth above, the cam assembly 160 is actually made up of two cam sectors 180 and 182, shown in greater detail in FIGURES 8 and 9. The lower cam sector 180 is fixed for rotation with the cam shaft 124 while the upper cam sector 182 is merely journaled on the cam shaft for selective rotation relative to the lower sector 180 to vary the angular extent of arcuate surface 164 and gap 174. The variation of the angular extent is limited to fixed increments corresponding to the selectable, predetermined fixed increments of advancement of the strip 12 by the employment of a pin 184 carried by the upper sector 182, which pin can be selectively inserted into any one of a series of sockets 186 in the lower sector 180 to fix the position of one sector relative to the other. FIGURES 8 and 9 illustrate two such relative positions. A thumb nut 188 retains the upper sector 182, as well as the entire cam assembly 160, in place upon the cam shaft.

Referring now to FIGURES 1, 2, 5, 7, 10 and 11, the cut-off means 36 is seen to comprise a stationary blade 190 affixed to the frame 50 of the apparatus 10 and a movable blade 192 mounted above the uppermost edge 40 of strip 12 at 194 for pivotal movement between an open position to the left in FIGURE 5 and a closed position to the right in FIGURE 5 so that strip 12 can be passed between the blades 190 and 192 as the strip is advanced from the coil 14 to the tray means 46 when the movable blade 192 is in the open position and will be severed when the movable blade 192 is moved to the closed position. During operation of the tractor mechanism 70 and the advancement of the strip 12 to the tray means, the movable blade is resiliently biased toward the open position and retained in that position by a helical spring 195.

It is noted that the full cycle of operation of apparatus 10 calls for one full revolution of the cam shaft 124; however, the tractor mechanism 70 is actuated by the drive shaft 94 only while follower 162 is within gap 174 of the cam assembly 160 and thus operates over only a portion of the full cycle. Since the maximum angular extent of gap 174, as shown in FIGURE 9, still leaves an angular extent of about 180° in arcuate surface 164, the cam shaft 124 is still able to rotate through about one-half a revolution after completion of the advancement of the strip 12 by the tractor mechanism 70. During this remaining portion of the cycle, a shear cam 196, which is fixed for rotation with the cam shaft 124 and up to this time has presented an arcuate surface 197 to a follower 198 (FIGURE 10), will now present a lobe 200 to the follower 198 (FIGURE 11) to pivot crank 202 about pivot 204 and actuate push-rod 206, which is linked to the movable blade 192 by a mounting pad 208, to pivot the movable blade from the open position, against the bias of spring 195, to the closed position and to sever the strip 12. Thus, the configuration of shear cam 196 is such that the movable blade 192 is permitted to remain at the open position during that portion of the cycle when the strip 12 is being advanced between the blades and will actuate the blade 192 after such advancement is complete.

The pivoted blade arrangement of the cut-off means 36 provides clean, effective severance of the strip 12. The placement of the pivot 194 above the upper edge 40 of the strip 12 (see FIGURE 3) is advantageous in that the pressure sensitive tape 32, which is usually placed along the upper edge of the strip, is heavier and more difficult to sever than the remainder of the strip and the instant arrangement places the most efficient portion of the cut-off means adjacent the most difficult to sever portion of the strip. In addition, a second helical spring 209 is placed between the movable blade 192 and frame 50 (as seen in FIGURE 3) to resiliently retain the movable blade against the fixed blade 190 all along the length of cut and assure effective shearing action.

Referring now to FIGURES 1, 2, 3, 5, 6 and 12 through 16, tray means 46 includes a back plate 210 upon which is mounted a guide rail 212, the guide rail being selectively movable along the backing plate by virtue of a thumb screw 214 passing through a vertically directed slot 216 so that the ledge 218 of the guide rail can be raised or lowered to coincide with the line of travel followed by the lowermost edge 42 of the strip 12 and will thereby locate and support the stencil label 18 at the proper location with respect to sheet 20 which passes behind the back plate 210, as seen in FIGURE 1. The back plate 210 terminates at its upper end 219 short of the uppermost edge 40 of the strip 12 so that the adhesive tape 32 extends beyond the back plate 210 and is exposed for subsequent direct contact with sheet 20. A front frame 220 lies over the front of the stencil label 18 and carries a pair of resilient spring bands 222 secured to the front frame by an anchor block 224 and bowed toward the back plate, as seen in FIGURE 12, to exert a resilient holding force which gently retains the stencil label 18 in place on the back plate.

Where apparatus 10 is employed merely to dispense stencil labels 18 of selected length, each stencil label may be manually or otherwise removed from the tray means after the cut-off means has severed strip 12 to form the stencil label lying in the tray; however, the illustrated embodiment of the apparatus goes further in that it provides for the attachment of each stencil label 18 to the sheet 20 passed behind the back plate of the tray means. To this end, both the back plate 210 and the front frame 220 are mounted for pivotal movement upon a longitudinally extending pin 226 which is fixed to the frame 50 of apparatus 10 and upon which are journaled bearing blocks 228 which are integral with the back plate 210 and sleeves 230 which are affixed to the front frame 220. A pressure pad 232 is carried by the front frame 220 at the top thereof in longitudinal alignment with the path of travel followed by the uppermost edge 40 of the strip 12, but normally spaced horizontally therefrom, as seen in FIGURE 12.

As best seen in FIGURES 5 and 6, the cam shaft 124 carries a back plate actuating cam 240 and a pressure cam 242, both of which are illustrated in greater detail in FIGURES 13 through 16. Cam 240 is engaged by a follower 244 fixed to a crank 246 which is pivotally mounted to frame 50 at post 248. A helical spring 250 biases the follower against the cam 240 and assures that the follower traces the contour of the cam 240. As the cam shaft 124 rotates through the initial portion of its one full revolution and the strip 12 is advanced and severed, the follower 244 and crank 246 remain stationary in the position shown in FIGURES 6 and 13 by virtue of the contour of cam 240 which includes an arcuate portion 252 of constant radius. Upon completion of the initial portion of the cycle of operation, the cam shaft 124 has rotated counterclockwise sufficiently to present the abrupt change in contour of cam 240 at 254 to the follower 244, as seen in FIGURE 14, whereupon the crank 246 is pivoted and a push-rod 256, which links the end of the crank with the back plate 210, pushes the back plate to pivot the back plate toward the sheet 20 and bring the stencil label 18 carried thereby in juxtaposition with the sheet 20 with the adhesive tape 32 of the stencil label in face-to-face relationship with the sheet 20.

Pressure cam 242 is engaged by a follower 260 fixed to a crank 262 which is pivotally mounted to frame 50, also at post 248. A helical spring 266 biases the follower 260 against the cam 242 and assures that the follower traces the contour of the cam 242. As the cam shaft 124 rotates counterclockwise through the initial portion of its one full revolution, the follower 260 and crank 262 remain stationary, in the position shown in FIGURES 6 and 15, by virtue of the contour of cam 242 which includes an arcuate portion 268 of constant radius. Upon completion of the initial portion of the cycle of operation, the cam shaft 124 has rotated sufficiently to present the abrupt change in contour of cam 242 at 270 to the follower 260, as seen in FIGURE 16, whereupon the crank 262 is pivoted and a push-rod 272, which links the crank 262 with the front frame 220, pushes the front frame to pivot the front frame backward and urge the pressure pad 232 against the strip 12 adjacent uppermost edge 40 to press the pressure sensitive adhesive tape 32 against the sheet 20 and affix the stencil label 18 to the sheet 20.

Upon further rotation of the cam shaft 124 to complete the one full revolution thereof and the full cycle of the apparatus, the cams 240 and 242 will return the back plate 210 and front frame 220 to their respective initial positions to ready the tray means for the advancement of the next increment of strip 12, and the apparatus resumes its idle to await the initiation of a subsequent cycle.

The contour of each cam 240 and 242 is such that the relative positions of back plate 210 and front frame 220 will permit ready advancement of the strip 12 between the back plate and the bowed spring bands 222, will establish firm clamping of the strip 12 between the back plate and the bowed spring bands during severing of the strip, during movement of the severed stencil label 18 to the sheet 20 and during pressing of the pressure pad against the adhesive tape 32, and will rapidly release the clamping force on the stencil label after the stencil label is affixed to sheet 20 to allow free advancement of sheet 20 with the stencil label 18 attached thereto.

It is to be understood that the above detailed description of an embodiment of the invention is provided by way of example only. Details of design and construction may be modified without departing from the true spirit and scope of the invention as set forth in the appended claims.

The embodiments of the invention in which an exclusive property or privilege is claimed are defined as follows:

1. Apparatus for dispensing stencil labels of selected length from a supply of strip material of indeterminate longitudinal length and finite lateral width between opposite edges thereof, and for locating each dispensed label at a predetermined location, said apparatus comprising:
   a frame;
   feed means associated with the frame for advancing an increment of said strip material along a prescribed path from said supply to the predetermined location;
   drive means associated with the frame and operating continuously during operation of the apparatus;
   operator means;
   timing means selectively coupled with the drive means for actuation through at least one complete cycle of operation in response to actuation of the operator means;
   selector means for coupling the feed means with the drive means to engender actuation of the feed means by the drive means in response to actuation of the timing means, but only during that portion of the full cycle of operation of the timing means necessary to advance an increment of said strip material corresponding to the selected length of the stencil label;
   cut-off means associated with the frame between the feed means and the predetermined location for severing the advanced increment from the strip material to establish the stencil label; and
   means for coupling the cut-off means with the drive means to engender actuation of the cut-off means by the drive means in response to actuation of the timing means, after completion of the portion of the full cycle of operation of the timing means during which the feed means is actuated.

2. The apparatus of claim 1 wherein:
   the timing means includes a cam shaft which rotates through one complete revolution during each full cycle of operation;
   the selector means includes a cam fixed to said cam shaft for rotation through one complete revolution during each said full cycle, said cam providing a cam surface of selected angular extent, a follower movable between a first position wherein the follower is engaged with said cam surface and a second position wherein the follower is not engaged with said cam surface, clutch means responsive to the arrival of the follower at one of said first and second positions for engaging the drive means with the feed means and responsive to the arrival of the follower at the other of said positions for disengaging the drive means from the feed means, and means for selectively varying the angular extent of said cam surface.

3. The apparatus of claim 2 wherein the clutch means includes a multi-stepped clutch having a plurality of teeth spaced to correspond to the selectable increments of advancement of the strip material and a latch movable into and out of engagement with any one of said teeth in response to movement of said follower between said first and second positions.

4. The apparatus of claim 3 including a solenoid linked to the latch for moving the latch in response to actuation of the solenoid, and an electrical switch for operating the solenoid, said switch being arranged for actuation by movement of the follower to operate the solenoid.

5. The apparatus of claim 3 wherein said cam includes juxtaposed sector members selectively movable relative to one another for varying the angular extent of said cam surface to establish the cam surface of selected angular extent.

6. The apparatus of claim 5 wherein said sector members are relatively movable in fixed increments corresponding to fixed increments of length of strip material to be advanced by the feed means.

7. The apparatus of claim 3 including a second clutch means responsive to the actuation of the operator means for engaging the timing means with the drive means, said second clutch means including a clutch having one tooth and a second latch movable into and out of the path of travel of the tooth in response to actuation of the operator means for delineating said full cycle of operation.

8. The apparatus of claim 7 including
   a first solenoid linked to the latch of the first said clutch means for moving the latch in response to actuation of the solenoid, and an electrical switch for operating the solenoid, said switch being arranged for actuation by movement of the follower to operate the solenoid;
   a second solenoid linked to the second latch of the second clutch means for moving said second latch in response to the actuation of the second solenoid; and
   said operator means including an electrical switch connected to the second solenoid for operating the second solenoid to initiate said full cycle of operation.

9. The apparatus of claim 8 wherein said cam includes juxtaposed sector members selectively movable relative to one another for varying the angular extent of said cam surface to establish the cam surface of selected angular extent.

10. The apparatus of claim 9 wherein said selector members are relatively movable in fixed increments of length of strip material to be advanced by the feed means.

11. The apparatus of claim 10 wherein the strip material includes a series of uniformly spaced apertures aligned longitudinally along the strip material, and said feed means includes a tractor mechanism having a series of pins, each of which pins is capable of engagement with a corresponding aperture in the strip material and capable of movement along a straight line in the longitudinal direction for effecting advancement of the strip material in accurate predetermined increments.

12. The apparatus of claim 1 wherein said supply of strip material is coiled about an axis, the apparatus including
   support means associated with the frame for supporting the coiled supply with said axis extending laterally with respect to the strip, said support means including at least a portion displaceable in a direction along said axis for accommodating strip material of various widths while maintaining one of said opposite edges of the strip material aligned along the same prescribed path for any chosen width of strip material.

13. The apparatus of claim 12 wherein said strip material is oriented such that one of said opposite edges is spaced vertically above the other of said opposite edges and the strip material includes adhesive attachment means located longitudinally along the strip material, said support means includes a platform for supporting the coiled supply adjacent the lowermost edge of the strip material, and means resiliently biasing the platform, and the coiled supply thereon, vertically upwardly to maintain the uppermost edge of the strip material aligned with said prescribed path and maintain accurate longitudinal alignment of said adhesive attachment means.

14. The apparatus of claim 13 wherein the strip material includes a series of uniformly spaced apertures aligned longitudinally along the strip material and maintained in accurate longitudinal alignment by said support means, and said feed means includes a tractor mechanism having a series of spaced pins, each of which pins is capable of engagement with a corresponding aperture in the strip material and capable of movement along a straight line in the longitudinal direction for effecting advancement of the strip material in accurate predetermined increments.

15. The apparatus of claim 1 wherein said strip material includes adhesive attachment means located longitudinally along the strip material adjacent one of the opposite edges thereof and said cut-off means includes a cut-off blade pivotally mounted upon said frame adjacent the path of said one of the opposite edges of the strip material.

16. The apparatus of claim 15 wherein the strip material is oriented with one of the edges thereof vertically above the other of the edges thereof and the adhesive attachment means is located along the uppermost edge of the strip material and the cut-off blade is pivotally mounted adjacent the path of said uppermost edge of the strip material.

17. The apparatus of claim 1 wherein said strip material includes adhesive attachment means located longitudinally along the strip material for attachment of the dispensed labels to a sheet, the apparatus including tray means associated with the frame and located at said predetermined location for receiving the increment of strip material advanced by said feed means;

a pressure pad mounted for movement relative to said frame and aligned longitudinally with said adhesive attachment means on the increment of strip material received in the tray; and means coupling the pressure pad with said drive means for engendering actuation of the pressure pad against the increment of strip material subsequent to actuation of the cut-off means to press the adhesive attachment means against said sheet.

18. The apparatus of claim 17 wherein the tray means is normally spaced from said sheet and is mounted for movement to a position juxtaposed with the sheet, said apparatus including means coupling the tray means with said drive means for engendering actuation of the tray means to said position juxtaposed with the sheet subsequent to the actuation of the cut-off means, and prior to actuation of the pressure pad, to bring the stencil label which is in the tray means into juxtaposition with the sheet for subsequent attachment by the pressing of the pressure pad.

References Cited

UNITED STATES PATENTS

| | | | |
|---|---|---|---|
| 1,635,171 | 7/1927 | Bernstein et al. | 83—203 X |
| 2,252,735 | 8/1941 | Sherman | 83—241 X |
| 2,915,965 | 12/1959 | Persak | 83—205 X |
| 2,928,304 | 3/1960 | Ehlert et al. | 83—205 |
| 3,153,361 | 10/1964 | Allen | 83—203 |
| 3,170,614 | 2/1965 | Faust | 83—203 X |

WILLIAM S. LAWSON, Primary Examiner

U.S. Cl. X.R.

83—203, 241, 423, 524, 589, 602, 649; 156—519